United States Patent
Kumagai et al.

(10) Patent No.: US 10,414,306 B2
(45) Date of Patent: Sep. 17, 2019

(54) SEAT APPARATUS

(71) Applicant: TACHI-S CO., LTD., Akishima-shi, Tokyo (JP)

(72) Inventors: Kotaro Kumagai, Tokyo (JP); Masayuki Taguchi, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 84 days.

(21) Appl. No.: 15/559,040

(22) PCT Filed: Mar. 11, 2016

(86) PCT No.: PCT/JP2016/057882
§ 371 (c)(1),
(2) Date: Sep. 16, 2017

(87) PCT Pub. No.: WO2016/158330
PCT Pub. Date: Oct. 6, 2016

(65) Prior Publication Data
US 2018/0093596 A1 Apr. 5, 2018

(30) Foreign Application Priority Data
Mar. 31, 2015 (JP) .................. 2015-073190

(51) Int. Cl.
*B60N 2/58* (2006.01)
*B60N 2/90* (2018.01)
*B60N 2/02* (2006.01)

(52) U.S. Cl.
CPC ......... *B60N 2/5883* (2013.01); *B60N 2/0228* (2013.01); *B60N 2/90* (2018.02)

(58) Field of Classification Search
CPC ........ A41B 1/08; A45F 5/00; A45F 2005/008; A45F 2200/0516; B60N 2/58; B60N 2/0228
See application file for complete search history.

(56) References Cited

U.S. PATENT DOCUMENTS 1,853,579 A * 4/1932 Sallop .................. B60N 2/6027
297/223
2,667,211 A * 1/1954 Krasnov ................ A47C 31/11
297/224

(Continued)

FOREIGN PATENT DOCUMENTS

| JP | H08-268125 A | 10/1996 |
| JP | 2010-012988 A | 1/2010 |
| JP | 2015-033972 A | 2/2015 |

OTHER PUBLICATIONS

Office Action from Japanese Patent Application No. 2015-073190, dated Jul. 31, 2018.

(Continued)

*Primary Examiner* — Shin H Kim
(74) *Attorney, Agent, or Firm* — Shapiro, Gabor and Rosenberger, PLLC

(57) ABSTRACT

A seat apparatus equipped with a seat cover that covers at least part of the seat apparatus surface and is formed by sewing a plurality of skin material pieces together, an operation unit for receiving an operation from an operator, and a covering material for covering the operation unit, wherein: the covering material is formed as part of the skin material pieces, or is formed by sewing a member that is separate from the skin material pieces to the skin material pieces; and a projection is formed that projects in the outward direction from the seat cover when the operation unit is covered.

11 Claims, 7 Drawing Sheets

(56) References Cited

U.S. PATENT DOCUMENTS

| | | | | |
|---|---|---|---|---|
| 4,047,756 A * | 9/1977 | Ney | ............... | B60N 2/58 297/219.1 |
| 4,366,342 A * | 12/1982 | Breedlove | ............... | H01L 21/4846 174/260 |
| 5,401,922 A * | 3/1995 | Asta | ............... | B60Q 5/003 200/5 A |
| 5,540,167 A * | 7/1996 | Mussig | ............... | A41D 27/24 112/10 |
| 5,965,856 A * | 10/1999 | Okada | ............... | B60N 2/002 200/514 |
| 6,079,779 A * | 6/2000 | Tanaka | ............... | B60N 2/585 297/219.1 |
| 6,084,217 A * | 7/2000 | Bulgajewski | ............... | H05B 3/14 219/219 |
| 6,150,642 A * | 11/2000 | Weiss | ............... | H05B 3/34 219/217 |
| 6,194,692 B1 * | 2/2001 | Oberle | ............... | H05B 3/34 219/528 |
| 6,455,823 B1 * | 9/2002 | Bulgajewski | ............... | H05B 3/26 219/543 |
| 6,664,512 B2 * | 12/2003 | Horey | ............... | H05B 3/342 219/211 |
| 6,710,303 B1 * | 3/2004 | Lorenzen | ............... | H05B 3/34 174/84 R |
| 6,838,647 B2 * | 1/2005 | Nagele | ............... | B62D 1/065 219/205 |
| 6,997,772 B2 * | 2/2006 | Fong | ............... | A63H 3/006 446/175 |
| 7,390,059 B2 * | 6/2008 | Brockschnieder | ... | B60N 2/5816 297/228.13 |
| 7,390,982 B2 * | 6/2008 | Schmidt | ............... | B60N 2/0228 200/5 R |
| 7,500,536 B2 * | 3/2009 | Bulgajewski | ............... | H05B 3/34 177/136 |
| 8,118,362 B2 * | 2/2012 | Nishimura | ............... | B60N 2/5685 297/180.12 |
| 8,465,093 B2 * | 6/2013 | Janowski | ............... | B60N 2/6018 297/180.11 |
| 8,556,319 B2 * | 10/2013 | Petouhoff | ............... | B60N 2/58 296/1.08 |
| 8,636,558 B2 * | 1/2014 | Eyzaguirre | ............... | A63H 3/28 446/330 |
| 8,723,043 B2 * | 5/2014 | Weiss | ............... | H01B 1/22 174/117 M |
| 8,946,945 B2 * | 2/2015 | Chu | ............... | A63H 3/02 307/125 |
| 8,948,962 B2 * | 2/2015 | Pywell | ............... | B60N 2/0228 297/378.12 |
| 9,283,869 B2 * | 3/2016 | Yamamoto | ............... | B60N 2/0228 |
| 9,717,115 B2 * | 7/2017 | Li | ............... | A61F 7/007 |
| 2003/0141983 A1 * | 7/2003 | Schmiz | ............... | B60N 2/002 340/687 |
| 2003/0173195 A1 * | 9/2003 | Federspiel | ............... | H01H 3/141 200/85 A |
| 2003/0231485 A1 * | 12/2003 | Chien | ............... | A41D 27/085 362/84 |
| 2004/0100131 A1 * | 5/2004 | Howick | ............... | B60N 2/5678 297/180.12 |
| 2005/0184565 A1 * | 8/2005 | Weiss | ............... | B60N 2/5635 297/180.15 |
| 2005/0204449 A1 * | 9/2005 | Baron | ............... | A41D 1/04 2/69 |
| 2006/0151455 A1 * | 7/2006 | Stowe | ............... | B60N 2/5635 219/202 |
| 2008/0296942 A1 * | 12/2008 | Schweiker | ............... | B60N 2/5685 297/217.3 |
| 2008/0296943 A1 * | 12/2008 | Hirota | ............... | A47C 7/38 297/217.3 |
| 2010/0000981 A1 * | 1/2010 | Diemer | ............... | H05B 3/146 219/202 |
| 2010/0038357 A1 * | 2/2010 | Fukuda | ............... | H01C 7/021 219/553 |
| 2010/0044075 A1 * | 2/2010 | Weiss | ............... | H01B 1/22 174/126.2 |
| 2010/0052381 A1 * | 3/2010 | Tingley | ............... | A61B 5/6887 297/217.3 |
| 2011/0109111 A1 * | 5/2011 | Petouhoff | ............... | B60N 2/58 296/1.08 |
| 2012/0091112 A1 * | 4/2012 | Wei | ............... | B60N 2/5685 219/202 |
| 2013/0068748 A1 * | 3/2013 | Csonti | ............... | H05B 3/34 219/202 |
| 2013/0105459 A1 * | 5/2013 | Tomas Tapia | ....... | B60N 2/5685 219/217 |
| 2013/0305974 A1 * | 11/2013 | Ishii | ............... | D05B 23/00 112/475.08 |
| 2013/0313099 A1 * | 11/2013 | Komaki | ............... | H01H 13/704 200/600 |
| 2015/0190269 A1 * | 7/2015 | Lenoble | ............... | A61F 5/30 128/894 |
| 2015/0375654 A1 * | 12/2015 | Lemarchand | ......... | D05B 15/00 297/452.1 |
| 2018/0003579 A1 * | 1/2018 | Esposito | ............... | A61B 5/6806 |
| 2018/0093596 A1 * | 4/2018 | Kumagai | ............... | B60N 2/5883 |
| 2018/0099582 A1 * | 4/2018 | Worlitz | ............... | B60N 2/58 |
| 2018/0261054 A1 * | 9/2018 | Eryilmaz | ............... | A41B 1/08 |
| 2018/0338544 A1 * | 11/2018 | Huang | ............... | G06F 3/044 |
| 2018/0345832 A1 * | 12/2018 | Kumagai | ............... | A47C 31/02 |
| 2018/0368559 A1 * | 12/2018 | Wang | ............... | A45F 5/00 |
| 2019/0006872 A1 * | 1/2019 | Ali | ............... | H02J 7/025 |

OTHER PUBLICATIONS

International Search Report from International Patent Application No. PCT/JP2016/057882, dated May 24, 2016.

* cited by examiner

SEAT APPARATUS

TECHNICAL FIELD

The present invention relates to a chair equipped with an operation unit for instructing various operations, for example, a seat (seat apparatus) for automobiles equipped with an operation unit.

BACKGROUND ART

For example, an operation switch provided in a seat for automobiles is used to turn on/off an in-vehicle lighting system, adjust a seat slide position, adjust a reclining angle, turn on/off a seat heater or adjust room temperature, control a music playback, or perform any other operation.

FIG. 9 illustrates a seat for automobiles of related art. In related art, an operation switch 105 is often provided in a synthetic resin-made finisher 104 attached to a side face of a seat cushion 1. For this reason, the disposition of the operation switch 105 is restricted by an automobile frame and a seated person's feeling, such as a foreign body sensation and the position of installation thereof is limited. If the operation switch 105 is placed on a side face of the seat cushion 1, the width of the seat cushion 1 would be limited.

Patent Literature 1 discloses that an operation switch for instructing various operations is provided in a side face of a seat for automobiles.

CITATION LIST

Patent Literature

PTL 1: Japanese Patent Application Laid-Open No. Hei 8(1996)-268125

SUMMARY OF INVENTION

Technical Problem

It is an object of the present invention to provide a technology that makes it possible to increase a degree of freedom in a position where an operation unit is provided in a seat apparatus.

Solution to Problem

To achieve the above object, a typical configuration of a seat apparatus according to the present invention is as follows:

A seat apparatus includes:

a seat cover formed by sewing together a plurality of skin material pieces and covering at least a part of the surface of the seat apparatus;

an operation unit accepting an operation from an operator; and a covering material covering the operation unit.

The covering material is formed as a part of the skin material pieces or formed by sewing a member different from the skin material pieces together with the skin material pieces. When the covering material covers the operation unit, a projection projected outward of the seat cover is formed.

Advantageous Effects of Invention

According to the above configuration, a degree of freedom in a position where the operation unit is to be provided can be enhanced.

DESCRIPTION OF EMBODIMENTS (Embodiment of the Invention)

A description will be given to an embodiment of the present invention.

Figure 1:
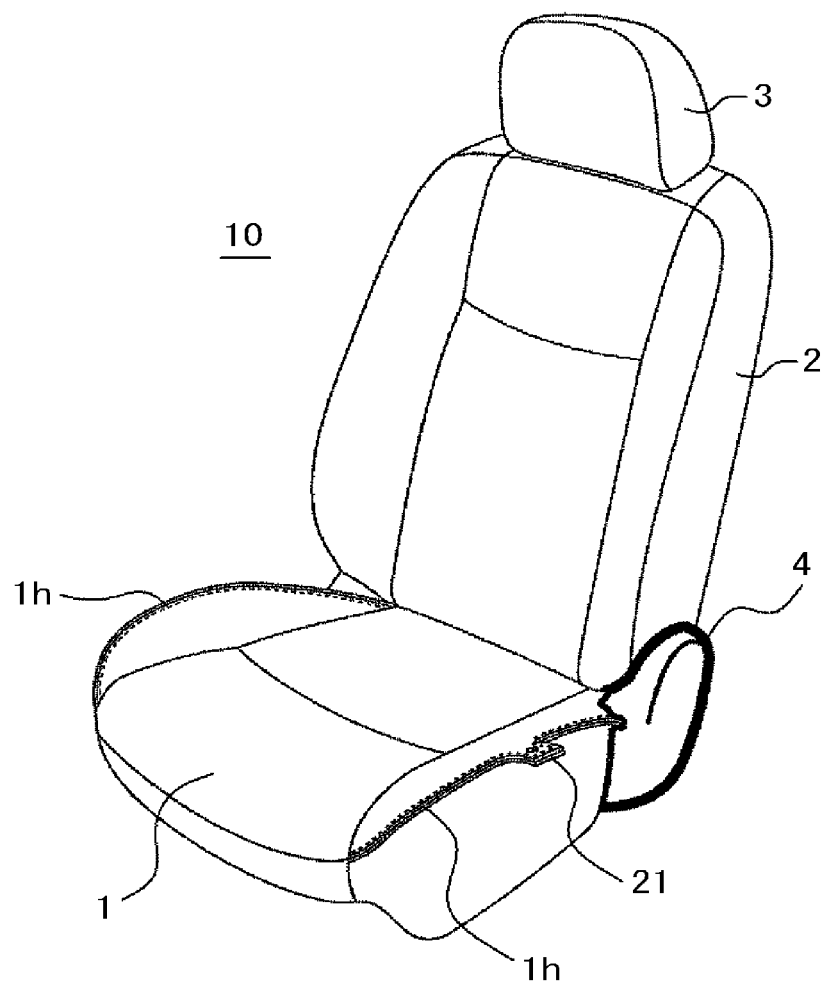
FIG. 1 is a perspective view of a seat apparatus in an embodiment of the present invention.

FIG. 1 is a perspective view of a seat apparatus in the embodiment of the present invention. The seat apparatus 10 in this embodiment is a seat for automobiles and is configured to include a seat cushion (seating portion) 1 on which a seated person seats him/herself, a seat back 2 to be a backrest for a seated person, a headrest 3 supporting the head of a seated person, and a synthetic resin-made finisher 4 as a plate for enhancing the appearance and protecting an occupant, as shown in FIG. 1.

The seat cushion 1 is configured to include a cushion pad (not shown) formed of such an elastic material as urethane and a seat cover (not shown) covering and protecting the cushion pad. Like the seat cushion 1, the seat back 2 and the headrest 3 are respectively formed to cover and protect an elastic pad (not shown) with a seat cover (not shown).

A seat cover is formed into a bag shape in accordance with the shape of the seat by a plurality of skin material pieces being sewed together such that the skin material pieces are joined together at their ends to form one face and covers at least a part of the seat apparatus 10. A seam line (stitch line), which is portions of a skin material piece and a skin material piece sewed together, is positioned, among the seat covers, between the seating face and a side face (first side face) of the seat cushion 1, between the backrest face and a side face (second side face) of the seat back 2, between the head bearing face and a side face (third side face) of the headrest 3, and the like. The first to third side faces are respectively substantially perpendicular to the seating face, backrest face, and head bearing face. A material of the skin material pieces is, for example, chemical fiber, synthetic leather, or genuine leather and are approximately 0.7 to 2.0 mm in thickness.

In the example in FIG. 1, seam lines 1h are shown in the seat cushion 1 and a tag (label)-like projection 21 is shown on a seam line 1h. The projection 21 houses an operation unit for accepting various operations from an operator. In the example in FIG. 1, the operation unit is a tag-like switch. In this embodiment, as mentioned above, a switch is not provided in a finisher unlike related art and thus the finisher can be reduced in size as compared with related art. Further, the breadth of the seat cushion 1 can be increased.

EXAMPLE 1

Figure 2:
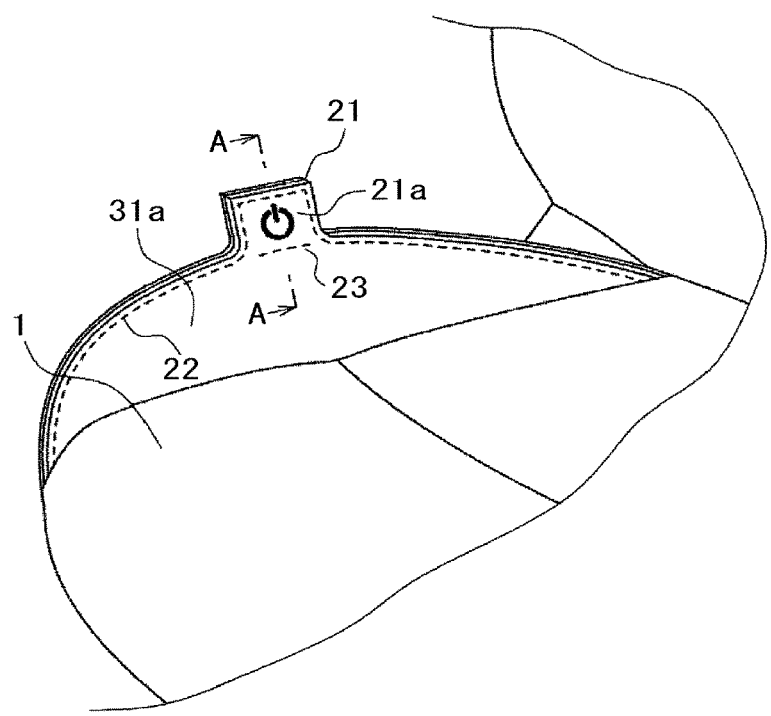
FIG. 2 is a partial perspective view of a seat apparatus in Example 1 of the embodiment of the present invention.
Figure 3:
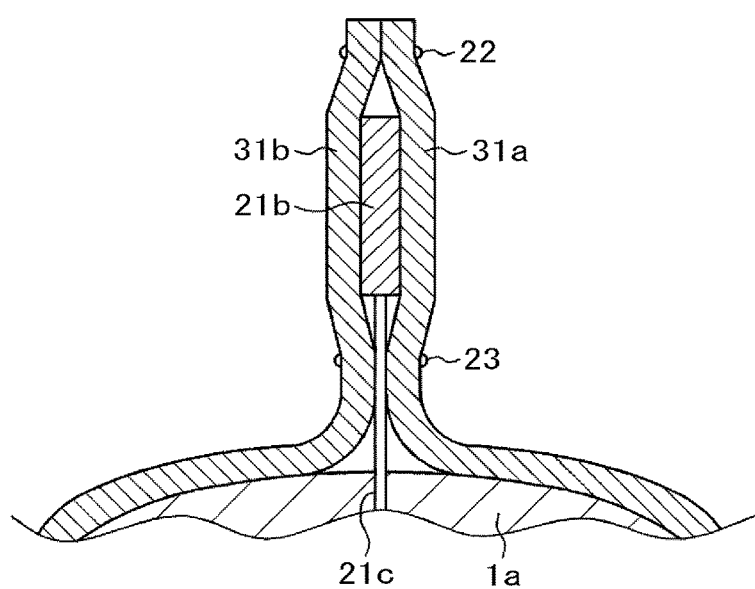
FIG. 3 is a sectional view taken along line A-A of FIG. 2.

A description will be given to a seat apparatus in Example 1 of this embodiment with reference to FIG. 2 and FIG. 3. FIG. 2 is a partial perspective view of the seat apparatus in Example 1, illustrating the structure of a projection 21 with an operation unit housed therein. FIG. 3 is a sectional view taken along line A-A of FIG. 2. As shown in FIG. 2 and FIG. 3, in Example 1, the projection 21, that is, the operation unit is provided on a seam line 1h between the seating face and a side face of the seat cushion 1.

As shown in FIG. 2 and FIG. 3, a seat cover covering the surface of a cushion pad 1a is configured to include a skin material piece 31a and a skin material piece 31b. In proximity to a seam 22 between the skin material piece 31a and the skin material piece 31b, respective parts of the skin material piece 31a and the skin material piece 31b form the projection 21 projected outward of a seat cover.

An end of the skin material piece 31a and an end of the skin material piece 31b are sewed together opposite to each other outside the seat cover as shown in FIG. 2. Thus, the projection 21 is formed into a bag shape. A switch unit 21b as an operation unit is housed in a space between the skin material piece 31a and the skin material piece 31b forming the bag-like projection 21. That is, a covering material covering the operation unit 21b is formed as parts of skin material pieces and forms the projection 21 projected outward of the seat cover with the operation unit 21b covered therewith.

The switch unit 21b and a control unit (not shown) are in signal communication with each other via a switch wiring 21c. The switch unit 21b and the control unit may be in wireless communication with each other and in this case, the switch wiring 21c is unnecessary. The control unit is installed, for example, below the seat cushion 1 and controls a reclining angle based on an instruction from an operator accepted at the operation unit 21b.

As mentioned above, the seam (stitch) 22 indicating a trail of a sewing thread is formed at an end of the skin material piece 31a and an end of the skin material piece 31b. The seam 22 is linearly formed in the vicinity of the projection 21 and is formed in a U shape along ends of the projection 21 in the projection 21.

That is, a first seam as the seam between an end of the skin material piece 31a and an end of the skin material piece 31b is formed as a single continuous line running along the end of the skin material piece 31a and the end of the skin material piece 31b and along the ends of the projection 21.

At the base portion (seat cover-side end) of the projection 21, the skin material piece 31a and the skin material piece 31b are sewed together and a seam 23 is thereby linearly formed. The seam 23 allows the switch unit 21b to be prevented from getting out of the projection 21. In the position of the seam 23, portions corresponding to the seam 23 may be bonded together instead of sewing together the skin material piece 31a and the skin material piece 31b.

The seam 23 is formed on an extended line from the linear seam 22 in the vicinity of the projection 21. That is, a second seam formed by sewing together the skin material piece 31a and the skin material piece 31b is formed on an extended line from a first seam at the base portion of the projection 21. Since the seam 23 is formed on an extended line from the linear seam 22 in the vicinity of the projection 21 as mentioned above, the design quality of the seat including the projection 21 can be enhanced.

An icon 21a indicating a function of the switch unit 21b (operation unit) is marked on the surface of the projection 21. In this example, the icon 21a denotes a power switch. Since a functional marking indicating a function of the operation unit is provided on the surface of the projection 21 as mentioned above, it is possible to suppress an operator from performing an erroneous operation.

In the example in FIG. 3, the projection 21 is projected from the surface of the seat cover in a direction perpendicular to the surface of the seat cover. However, the projecting direction of the projection 21 can be easily varied by shifting the position where the skin material piece 31a and the skin material piece 31b are sewed together. For example, the projection 21 can also be projected outward of the seat cushion 1 from the surface of the seat cover in a direction substantially parallel to the surface of the seat cover. Thus, the projection 21 is less prone to interfere with a seated person.

In the example in FIG. 2, the projection 21 is provided on the right side of the seat cushion 1. Instead, the projection may be provided on the left seam line 1h of the seat cushion 1 and can be provided on any seam line on the seat, including a seam line of the seat back 2 and a seam line of the headrest 3. The terms of right and left cited herein refer to directions as viewed from the point of view of a driver who seats him/herself on the seat cushion 1.

According to Example 1, at least the following effects are brought about:

(A1) The covering material covering the operation unit is formed as parts of skin material pieces and the covering material forms the projection projected outward of the seat cover with the operation unit covered therewith. Therefore, the operation unit can be provided in other areas than a side face of the seat cushion. This makes it possible to reduce the size of the finisher and increase the breadth of the seat cushion.

(A2) The covering material is formed by sewing together an end of a first skin material piece and an end of a second skin material piece opposite to each other such that the skin material pieces are projected outward of the seat cover outside the seat cover. Therefore, the operation unit can be easily provided in the seat cushion.

(A3) The first seam as a seam between an end of the first skin material piece and an end of the second skin material piece is formed to form one continuous line along the end of the first skin material piece and the end of the second skin material piece and along ends of the projection. At the base portion of the projection, a second seam formed by sewing together the first skin material piece and the second skin material piece is formed on an extended line from the first seam in the vicinity of the projection. This makes it possible to prevent displacement of the switch unit 21b as well as to enhance the design quality of the seat including the projection.

(A4) The projection is provided between the seating face and a side face of the seat cushion. This makes it easy for an operator to perform an operation.

(A5) The functional marking indicating a function of the operation unit is provided on the surface of the projection; therefore, it is possible to suppress an operator from performing an erroneous operation.

EXAMPLE 2

Figure 4:
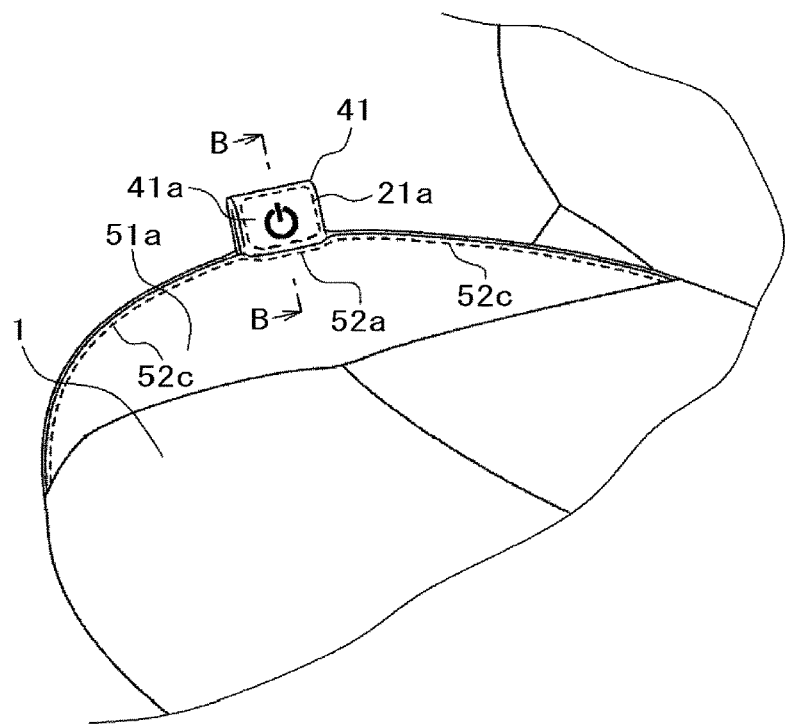
FIG. 4 is a partial perspective view of a seat apparatus in Example 2 of the embodiment of the present invention.
Figure 5:
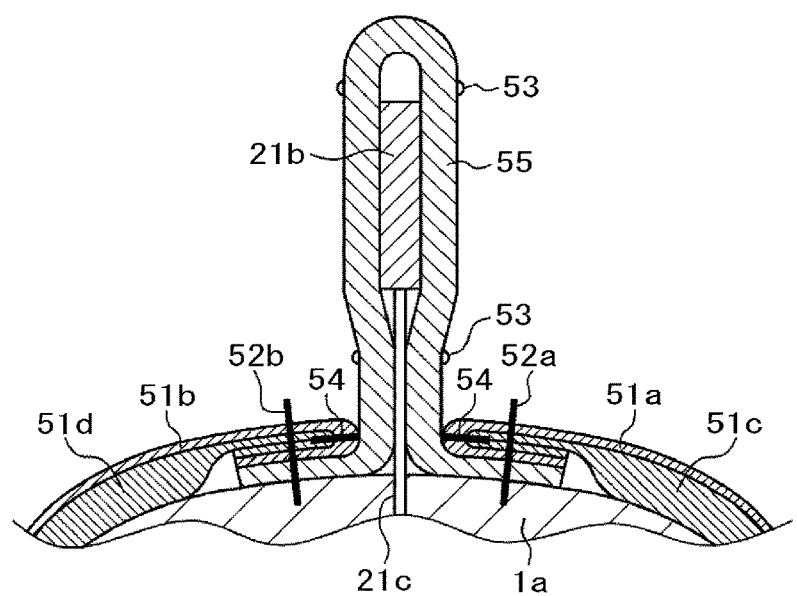
FIG. 5 is a sectional view taken along line B-B of FIG. 4.

A description will be given to a seat apparatus in Example 2 of this embodiment with reference to FIG. 4 and FIG. 5. FIG. 4 is a partial perspective view of the seat apparatus in Example 2, illustrating the structure of a projection 41 with the operation unit housed therein. FIG. 5 is a sectional view taken along line B-B of FIG. 4. Also in Example 2, as in Example 1, the projection 41, that is, the operation unit is provided on a seam line 1*h* between the seating face and a side face of the seat cushion 1. The same configuration elements as in Example 1 will be marked with the same reference signs and a description thereof will be omitted.

As shown in FIG. 4 and FIG. 5, at a seam between a skin material piece 51*a* and a skin material piece 51*b* constituting a seat cover covering the surface of the cushion pad 1*a*, a covering material 55 covering a switch unit 21*b* as an operation unit forms a projection 41 projected outward of the seat cover. The covering material 55 is a member different from the skin material piece 51*a* and the skin material piece 51*b* (That is, the covering material is a different thing that is not formed as a part of a skin material piece.). When developed, the covering material is rectangular and approximately 0.7 to 2.0 mm in thickness. A material of the covering material 55 is, for example, chemical fiber, synthetic leather, or genuine leather and may be identical with or may be different from that of the skin material pieces. An icon 41*a* indicating a function of the switch unit 21*b* is marked on the surface of the projection 41.

The covering material 55 is folded at the central part thereof and both ends thereof are sewed with a sewing thread 54 together with an end of the skin material piece 51*a* and an end of the skin material piece 51*b* as shown in FIG. 5. An end of the covering material 55 refers to a portion other than the central part obtained by equally dividing the length of the covering material 55 into three in the longitudinal direction.

Both ends of the folded covering material 55 are sewed together with a sewing thread 53 so as to encircle the projection 41 along the ends thereof. A seam is formed by the sewing thread 53 at the upper end (end on the side of the folded portion of the covering material 55, that is, outer end) and the lower end (end on the seat cover side, that is, inner end) of the projection 41 shown in FIG. 5. This seam is intended to secure the switch unit 21*b* housed in the projection 41 to prevent displacement thereof and to enhance the design quality of the seat and is not indispensable. Either or both of the seams at the upper end and lower end of the projection 41 may be omitted. Even in these cases, the folded portions are sewed together with a sewing thread 54 described lather and the switch unit 21*b* does not get out of the projection 41 even though the switch unit 21*b* may be displaced.

A more detailed description will be given. At the base portion (seat cover-side end) of the projection 41, an end of the skin material piece 51*a* with a urethane piece 51*c* bonded to the inside thereof and an end of the skin material piece 51*b* with a urethane piece 51*d* bonded to the inside thereof are folded back inward of the seat cover. These folded portions and both ends of the covering material 55 are sewed together with the sewing thread 54 in a direction parallel to the surface of the seat cover (horizontal direction in FIG. 5). For this reason, the sewing thread 54 is hidden by the skin material piece 51*a* and the skin material piece 51*b* and does not attract people's attention.

Between the seam of the sewing thread 54 and the ends of the covering material 55, one end of the covering material 55 and an end of the skin material piece 51*a* folded back inward of the seat cover are sewed together with a sewing thread 52*a*. Specifically, a folded end of the skin material piece 51*a*, one end of the covering material 55, and a cushion pad 1*a* are sewed together with the sewing thread 52*a* such that these items are superposed from above in this order.

Between the seam of the sewing thread 54 and the ends of the covering material 55, the other end of the covering material 55 and an end of the skin material piece 51*b* folded back inward of the seat cover are sewed together with a sewing thread 52*b*. Specifically, a folded end of the skin material piece 51*b*, the other end of the covering material 55, and the cushion pad 1*a* are sewed together with the sewing thread 52*b* such that these items are superposed from above in this order.

In an area other than the base portion of the projection 41, an end of the skin material piece 51*a* and an end of the skin material piece 51*b* are sewed together with a sewing thread 52*c* opposite to each other like the skin material piece 31*a* and the skin material piece 31*b* in Example 1. In the projection 41, as mentioned above, a folded end of the skin material piece 51*a* and one end of the covering material 55 are sewed together with the sewing thread 52*a*; and a folded end of the skin material piece 51*b* and the other end of the covering material 55 are sewed together with the sewing thread 52*b*. As shown in FIG. 4, the seam of the sewing thread 52*a* is formed on an extended line from the seam of the sewing thread 52*c*. Similarly, the seam of the sewing thread 52*b* is formed on an extended line from the seam of the sewing thread 52*c*.

Thus, the projection 41 is formed into a bag shape of the covering material 55. In a space between a part of the covering material 55 and a part of the covering material 55 forming this bag-like projection 41, the switch unit 21*b* is housed and the switch wiring 21*c* is connected to the switch unit 21*b*.

The covering material 55 may be different in material or color from the skin material piece 51*a* or the skin material piece 51*b*. Adopting a different material or color can make the projection 41 housing the switch unit 21*b* (operation unit) conspicuous. Further, the design quality of the seat including the projection 41 can be enhanced.

As described up to this point, an end of the skin material piece 51*a* and an end of the skin material piece 51*b* are folded back inward of the seat cover and these folded portions and both ends of the covering material 55 are sewed together with the sewing thread 54. For this reason, without sewing the lower end of the projection 41 with the sewing thread 53, the lower end of the projection 41 is closed and the covering material 55 is secured on the skin material piece 51*a* and the skin material piece 51*b*. That is, without sewing together the folded ends of the skin material piece 51*a* and the skin material piece 51*b* and the ends of the covering material 55 with the sewing thread 52*a* or the sewing thread 52*b* at the projection 41, the covering material 55 is secured on the skin material piece 51*a* and the skin material piece 51*b*.

Since at least either of the upper end and the lower end of the projection 41 is sewed with the sewing thread 53, the switch unit 21*b* housed in the projection 41 can be secured without displacement and the design quality of the seat including the projection 41 can be enhanced.

Since the seams of the sewing thread 52*a* and the sewing thread 52*b* at the projection 41 is formed on an extended line from the seam of the sewing thread 52*c* in the vicinity of the projection 41, the design quality of the seat including the projection 41 can be enhanced.

In the example in FIG. 5, the projection 41 is projected from the surface of the seat cover in a direction perpendicular to the surface of the seat cover. However, the projecting direction of the projection 41 can be easily varied by shifting the position where both ends of the covering material 55 are sewed together.

According to Example 2, at least the following effects are brought about:

(B1) Inside the seat cover, both ends of the covering material covering the operation unit, an end of a first skin material piece, and an end of a second skin material piece are sewed together and the central part of the covering material forms a projection projected outward of the seat cover. For this reason, the operation unit can be provided in an area other than a side face of the seat cushion. As a result, the size of the finisher can be reduced and the breadth of the seat cushion can be increased.

(B2) In areas other than the projection, an end of a first skin material piece and an end of a second skin material piece are sewed together opposite to each other such that these ends are projected outward of the seat cover and a first seam is thereby formed. At the base portion of the projection, one end of the covering material and an end of the first skin material piece are sewed together and the other end of the covering material and an end of the second skin material piece are sewed together such that a resulting second seam is formed on an extended line from the first seam. For this reason, the design quality of the seat including the projection can be enhanced.

(B3) Since parts of the covering material are sewed together at least either of the outer end and the inner end of the projection, displacement of the operation unit housed in the projection can be suppressed.

(B4) Since the covering material is different in material or color from the first skin material piece or the second skin material piece, it is possible to improve the ease of operation or enhance the design quality of the seat including the projection.

EXAMPLE 3

Figure 6:
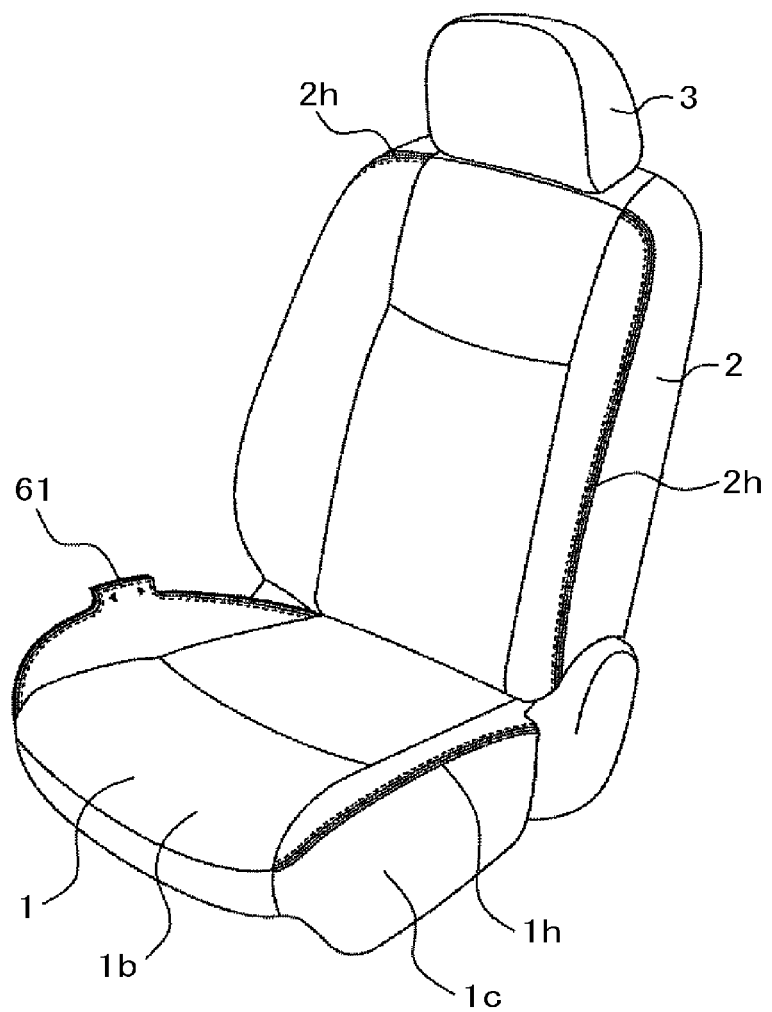
FIG. 6 is a perspective view of a seat apparatus in Example 3 of the embodiment of the present invention.

A description will be given to a seat apparatus in Example 3 of this embodiment with reference to FIG. 6. FIG. 6 is a partial perspective view of the seat apparatus in Example 3, illustrating a projection 61 with an operation unit housed therein. Also in Example 3, as in Example 1, the projection 61, that is, the operation unit is provided on a seam line $1h$ between the seating face and a side face of the seat cushion 1. The same configuration elements as in Example 1 will be marked with the same reference signs.

In Example 3, the projection 61 is provided in the same manner as in Example 1. The projection 61 may be provided in the same manner as in Example 2. In Example 3, the operation unit housed in the projection 61 is a control switch for adjusting, for example, a fore-and-after position of the seat. An icon indicating a forward direction or a rearward direction is marked on the surface of the projection 61.

In the example in FIG. 6, the projection 61 is provided on the right side of the seat cushion 1 but may be provided on the left seam line $1h$ of the seat cushion 1 or may be provided on a seam line $2h$ of the seat back 2. The projection may be provided on any seam line of the seat. The operation unit housed in the projection 61 need not be a control switch and may be any other type of a switch and further need not be a switch and may be any other type of an operation unit.

According to Example 3, as in Example 1, the projection is provided between the seating face and a side face of the seat cushion and it is easy for an operator to perform an operation.

EXAMPLE 4

Figure 7:
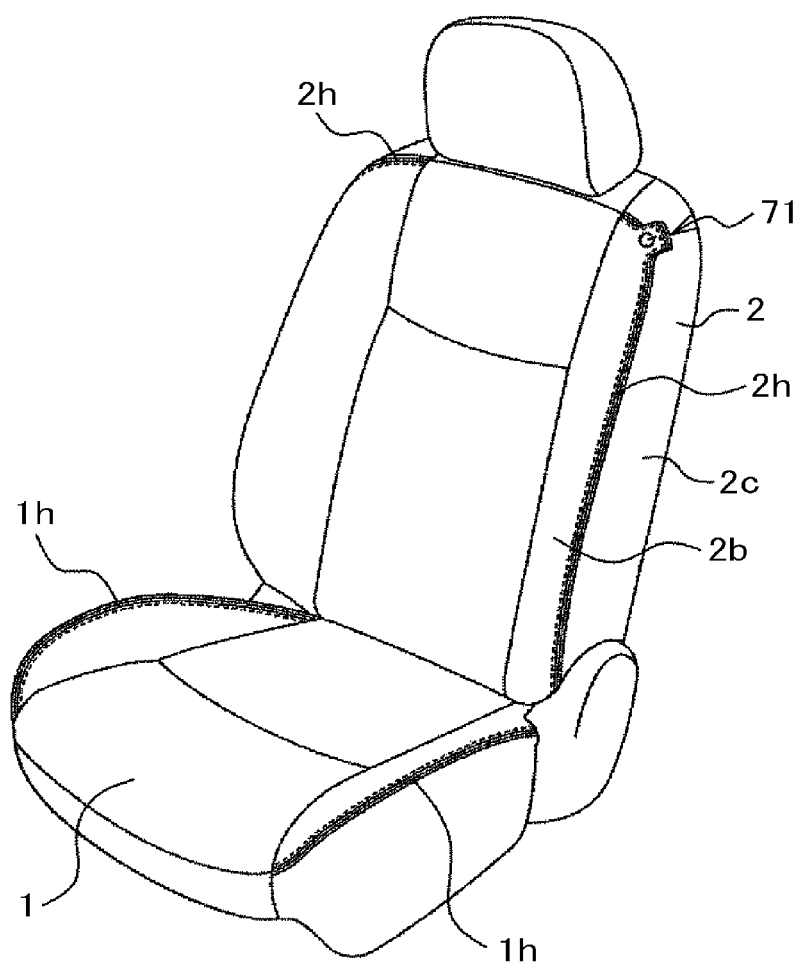
FIG. 7 is a perspective view of a seat apparatus in Example 4 of the embodiment of the present invention.

A description will be given to a seat apparatus in Example 4 of this embodiment with reference to FIG. 7. FIG. 7 is a partial perspective view of the seat apparatus in Example 4, illustrating a projection 71 with an operation unit housed therein. The same configuration elements as in Example 1 will be marked with the same reference signs.

The projection 71 is provided at the upper left part of the seat back 2 on a seam line $2h$ thereof. Specifically, the projection 71 is provided at the upper left part between the backrest face $2b$ of the seat back 2 and a side face $2c$ of the seat back 2. The projection 71 may be provided in any other position of the seat back on a seam line $2h$, for example, at the right upper part of the seat back on a seam line $2h$ thereof.

In Example 4, the projection 71 is provided in the same manner as in Example 1. The projection 71 may be provided in the same manner as in Example 2. In Example 4, the operation unit housed in the projection 71 is, for example, an on-off switch for turning on/off a room lamp. An icon indicating turn-on or turn-off of the room lamp is marked on the surface of the projection 71.

According to Example 4, the projection is provided at the left upper part or the right upper part of the seat back between the backrest face and a side face of the seat back. This suppress the projection from interfering with a seated person and thus a malfunction caused by an erroneous touch is also suppressed.

EXAMPLE 5

Figure 8:
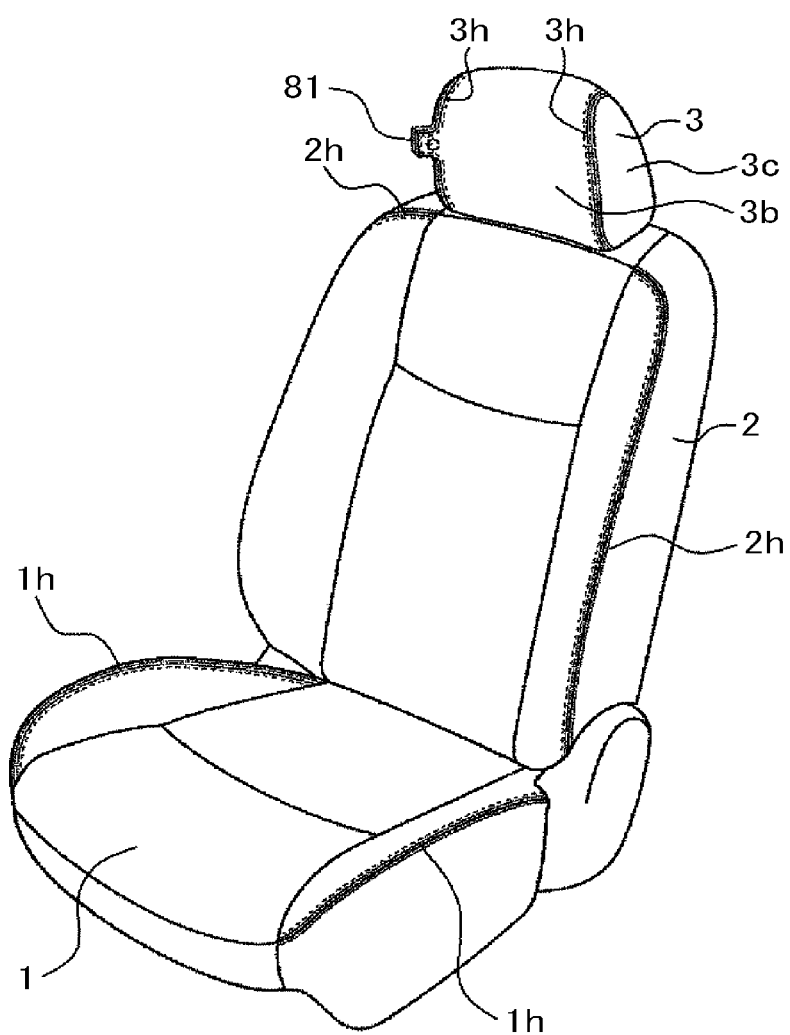
FIG. 8 is a perspective view of a seat apparatus in Example 5 of the embodiment of the present invention.
Figure 9:
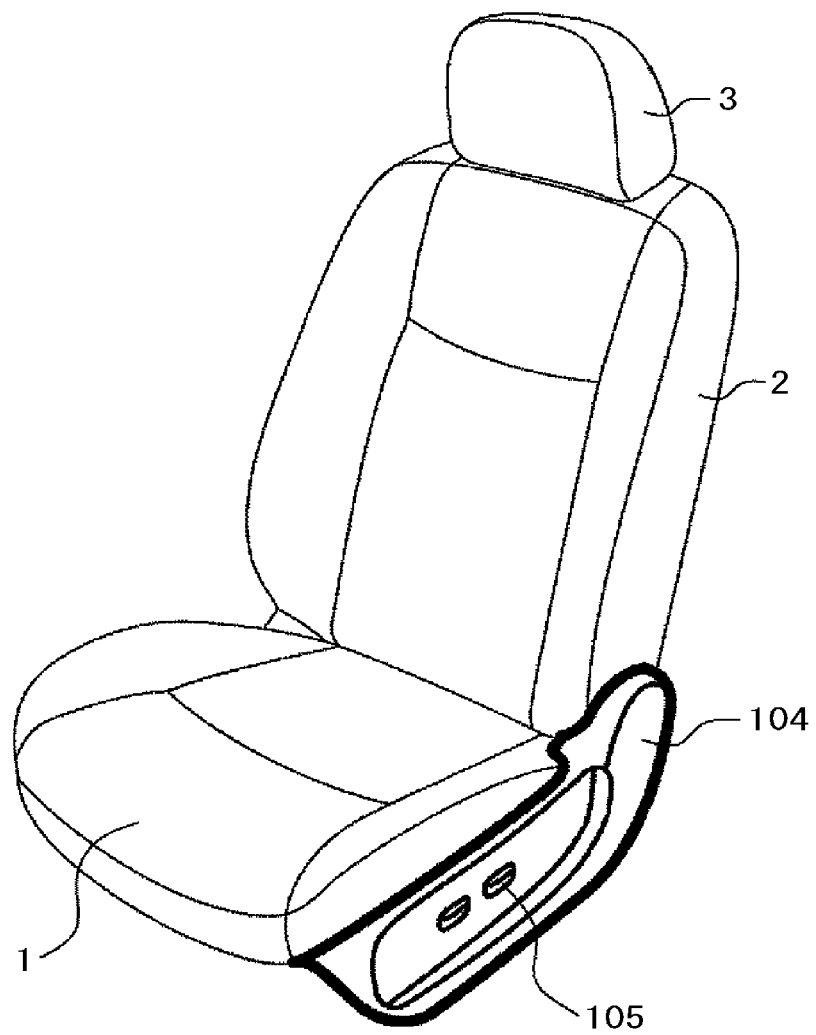
FIG. 9 is a drawing illustrating a seat for automobiles in related art.

A description will be given to a seat apparatus in Example 5 of this embodiment with reference to FIG. 8. FIG. 8 is a partial perspective view of the seat apparatus in Example 5, illustrating a projection 81 with an operation unit housed therein. The same configuration elements as in Example 1 will be marked with the same reference signs.

The projection 81 is provided at the central part of the right seam line $3h$ between the head bearing face $3b$ of the headrest 3 and the right side face $3c$ of the headrest 3. The head bearing face $3b$ is a face of the headrest 3 supporting the head of a seated person. The projection 81 may be provided in any other place of the headrest on a seam line $3h$, for example, at the central part of the left seam line $3h$.

In Example 5, the projection 81 is provided in the same manner as in Example 1. The projection 81 may be provided in the same manner as in Example 2. In Example 5, the operation unit housed in the projection 81 is, for example, an on-off switch for turning on/off an air conditioner. An icon indicating turn-on or turn-off of the air conditioner is marked on the surface of the projection 81.

According to Example 5, the projection is provided between the head bearing face and a side face of the headrest. This suppresses the projection from interfering with a seated person and thus a malfunction caused by an erroneous touch is also suppressed.

Up this point, a specific description has been given to the embodiment of the present invention but the present invention is not limited to the above-mentioned embodiment and may be variously modified without departing from the subject matter of the present invention.

In the description of the above-mentioned embodiment, a vehicular seat used in automobiles has been taken as an example. However, the present invention is also applicable to a seat (seat apparatus) used for other purposes than automobiles.

The seams in the above-mentioned embodiment may be partly or wholly configured as a junction obtained through bonding with an adhesive or the like. A more specific description will be given. In the above-mentioned embodiment, skin material pieces and covering materials are sewing with a sewing thread to form a junction between a skin material piece and a covering material. Instead, the skin material pieces and the covering material may be bonded together with an adhesive or the like to form the above-mentioned junction without use of a sewing thread.

REFERENCE SIGNS LIST

1: seat cushion,
1a: cushion pad,
1b: seating face,
1c: side face,
1h: seam line,
2: seat back,
2b: backrest face,
2c: side face,
2h: seam line,
3: headrest,
3b: head bearing face,
3c: side face,
3h: seam line,
4: finisher,
10: seat (seat apparatus),
21: projection,
21a: icon,
21b: switch unit (operation unit),
21c: switch wiring,
22: seam,
23: seam,
31a: skin material piece,
31b: skin material piece,
41: projection,
41a: icon,
51a: skin material piece,
51b: skin material piece,
51c: urethane piece,
51d: urethane piece,
52a: sewing thread,
52b: sewing thread,
52c: sewing thread,
53: sewing thread,
54: sewing thread,
55: covering material,
61: projection,
71: projection
81: projection,
104: finisher,
105: switch.

The invention claimed is:

1. A seat apparatus comprising:
a seat cover formed by sewing together a plurality of skin material pieces and covering at least a part of a surface of the seat apparatus;
an operation unit accepting an operation from an operator; and
a covering material covering the operation unit,
wherein the covering material forms a projection projected outward of the seat cover with the operation unit covered with the covering material,
wherein the covering material is formed as a part of the skin material pieces, and
wherein an end of a first skin material piece and an end of a second skin material piece are sewed together opposite to each other outward of the seat cover outside the seat cover, the projection being thereby formed.

2. The seat apparatus according to claim 1,
wherein a first seam as a seam between the end of the first skin material piece and the end of the second skin material piece is formed as a continuous line running along the end of the first skin material piece and the end of the second skin material piece and along an end of the projection, and
wherein, at a base portion of the projection, a second seam obtained by sewing together the first skin material piece and the second skin material piece is formed on an extended line from the first seam in a vicinity of the projection.

3. The seat apparatus according to claim 1,
wherein the projection is provided between a seating face and a side face of a seat cushion.

4. The seat apparatus according to claim 1,
wherein the projection is provided between a backrest face and a side face of a seat back.

5. The seat apparatus according to claim 4,
wherein the projection is provided at an upper part of the seat back.

6. The seat apparatus according to claim 1,
wherein the projection is provided between a head bearing face and a side face of a headrest.

7. The seat apparatus according to claim 1,
wherein a functional marking indicating a function of the operation unit is provided on a surface of the projection.

8. A seat apparatus comprising:
a seat cover formed by sewing together a plurality of skin material pieces and covering at least a part of a surface of the seat apparatus;
an operation unit accepting an operation from an operator; and
a covering material covering the operation unit,
wherein the covering material forms a projection projected outward of the seat cover with the operation unit covered with the covering material,
wherein the covering material is formed by sewing a member different from the skin material pieces together with the skin material pieces,
wherein, inside the seat cover, both ends of the covering material, an end of a first skin material piece, and an end of a second skin material piece are sewed together, and
wherein a central part of the covering material is projected outward of the seat cover, the projection being thereby formed.

9. The seat apparatus according to claim 8,
wherein in an area other than the projection, an end of the first skin material piece and an end of the second skin material piece are sewed together opposite to each other outward of the seat cover, a first seam being thereby formed, and
wherein at a base portion of the projection, a second seam obtained by sewing together one end of the covering material and an end of the first skin material piece and sewing together an other end of the covering material and an end of the second skin material piece is formed on an extended line from the first seam.

10. The seat apparatus according to claim 8, wherein at least either of an outer end and an inner end of the projection, parts of the covering material are sewed together.

11. The seat apparatus according to claim 8, wherein the covering material is different in material or color from the first skin material piece or the second skin material piece.

* * * * *